(12) United States Patent
Broberg

(10) Patent No.: US 6,529,680 B1
(45) Date of Patent: Mar. 4, 2003

(54) DEVICE FOR SELECTING AND CONTROLLING A PLURALITY OF SIGNAL SOURCES IN A TELEVISION SYSTEM

(75) Inventor: David K. Broberg, Lawrenceville, GA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 08/638,339

(22) Filed: Apr. 26, 1996

(51) Int. Cl.[7] .................................................. H04N 5/91
(52) U.S. Cl. .......................... 386/83; 348/731; 348/906; 725/49; 725/57
(58) Field of Search ............................... 386/1, 46, 83; 348/10, 552, 553, 554, 555, 556, 725, 731, 732, 733, 734, 706, 6, 705, 906, 441, 450; 455/3.2; 725/49, 48, 47, 57; H04N 5/91

(56) References Cited

U.S. PATENT DOCUMENTS

| | | | |
|---|---|---|---|
| 2,969,427 A | * 1/1961 | See ............................. | 348/906 |
| 3,716,758 A | 2/1973 | Palazzetti ..................... | 317/96 |
| 4,959,720 A | * 9/1990 | Duffield et al. ........... | 358/191.1 |
| 5,045,947 A | * 9/1991 | Beery ....................... | 358/192.1 |
| 5,065,235 A | 11/1991 | Iijima .......................... | 358/86 |
| 5,128,667 A | 7/1992 | Enomoto et al. ...... | 340/825.72 |
| 5,151,789 A | 9/1992 | Young ...................... | 358/194.1 |
| 5,255,180 A | 10/1993 | Shinoda et al. ............. | 364/140 |
| 5,291,343 A | 3/1994 | Goto ......................... | 360/33.1 |
| 5,297,204 A | 3/1994 | Levine ........................ | 380/10 |
| 5,303,063 A | 4/1994 | Kim et al. .................. | 358/335 |
| 5,329,376 A | 7/1994 | Kim et al. .................. | 358/335 |
| 5,341,166 A | 8/1994 | Garr et al. ..................... | 348/10 |
| 5,418,527 A | 5/1995 | Yashiro ................. | 340/825.24 |
| 5,420,647 A | 5/1995 | Levine ....................... | 348/734 |
| 5,436,676 A | * 7/1995 | Pint et al. .................... | 348/906 |
| 5,479,268 A | * 12/1995 | Young et al. ................ | 386/83 |
| 5,543,933 A | * 8/1996 | Kang et al. .................. | 386/83 |
| 5,550,576 A | * 8/1996 | Klosterman .................... | 348/6 |
| 5,635,989 A | * 6/1997 | Rothmuller ................. | 348/563 |

* cited by examiner

Primary Examiner—Vincent Boccio

(57) ABSTRACT

A device for selecting from one of a plurality of audio/video sources and connecting audiovisual signals from the selected source to input receiving circuitry such as the recording circuitry of a VCR or a display device. Based upon a user request such as a channel selection, the device accesses a list in memory to determine which source of a plurality of sources is associated with that channel. The associated source is then automatically connected to the input receiving circuitry and the associated source is automatically tuned to the requested channel.

29 Claims, 9 Drawing Sheets

DEVICE FOR SELECTING AND CONTROLLING A PLURALITY OF SIGNAL SOURCES IN A TELEVISION SYSTEM

FIELD OF THE INVENTION

The invention relates generally to television systems, and in particular to a device for simplifying a user's operation of audiovisual components connected to a television.

BACKGROUND OF THE INVENTION

Conventional videocassette recorders (VCRs), televisions and other television-based devices such as cable boxes are arranged to receive and record signals originating from one signal source. By way of example, many VCRs can be programmed to receive either modulated cable signals or modulated antenna (off-air VHF and UHF) signals. However, these are mutually exclusive modes, as the VCR can only be configured to receive from one or the other source as set by the user during initialization. If desired, the user can alternatively command the VCR to receive signals from line-level audio and composite video inputs, bypassing the tuner and providing a higher quality signal. In higher performance VCRs, the video signal inputs and/or outputs may be divided into separate luminance (Y) and chrominance (C) signals, which provide even greater video quality. Setting the VCR in these modes is also exclusionary in nature and depends on appropriate user commands.

Properly connecting VCRs to televisions and to other devices such as cable boxes and digital satellite television receivers is beyond the capability of many of the consumers who purchase such equipment. For example, to connect a cable box or antenna output and a digital satellite receiver to a single video recorder, which is in turn connected to a television monitor, A/B switches and/or signal splitters are required. In addition to the complex installation procedure, setting the A/B switches to perform a task such as viewing one channel from a digital satellite receiver while recording another channel from the cable box can itself become a complex undertaking. Moreover, this can degrade optimal picture quality, as switching and splitting are ordinarily done only with modulated signals.

The recording task becomes even more complex with timed recordings, for example, when the user is not present to empirically test the switch settings to verify that the proper source is connected to the VCR for recording at the proper time. By way of example, when a user wishes to make a timed videocassette recording of a program on a channel received at one of the signal sources, such as a cable box, the user must first make sure that the switches are set so that the cable box, and not some other device, is coupled to the appropriate VCR input. For a cable box, the appropriate VCR input is typically the modulated RF (e.g., 75 ohm coaxial) input jack. If the cable box is connected to the modulated input jack, then the user must program the VCR to record on either channel 3 or 4, depending upon which channel the signal is modulated onto by the cable box. The user must also tune the cable box to the appropriate channel as designated by the local cable company (e.g., channel 23 for Cinemax®). The VCR is then placed in its standby mode, while the cable box may need to be left in a powered-up condition.

The failure to precisely perform any one of these steps, and then leave the settings intact, is likely to result in improper recording. However, as can be appreciated, the steps necessary to perform the above-recording example are simply too numerous and complex for technologically unsophisticated consumers to perform. Even sophisticated consumers may occasionally become confused or otherwise fail to correctly set a switch or input the correct channel, and thus similarly fail to obtain the desired recording. Indeed, the most carefully configured settings may be defeated when another member of the household modifies the settings to temporarily view another program.

SUMMARY OF THE INVENTION

Accordingly, it is a primary object of the invention to provide a television-based device that simplifies user operation of a plurality of signal sources.

In accomplishing that object, it is a related object to provide a videocassette recorder, television receiver, monitor or other system control device wherein the signal source is automatically selected for the user.

Another object is to provide a device of the above kind wherein the selection, connection and operation of an appropriate signal source is automatically performed for the user based upon a simple user request.

Another object is to provide a device as characterized above that utilizes the optimal signal output capabilities of a device to maximize signal quality.

Briefly, the present invention provides a device for selectively providing audiovisual signals from one of a plurality of audio/video sources to input receiving circuitry of the device. The device includes a switch for selectively connecting the selected audio/video source to the input receiving circuitry, a memory for storing information including a plurality of channels and an audio/video source corresponding to each channel, and preferably information for controlling the tuning functions of each of the audio/video sources. Channel input circuitry receives a channel request from a user, and a switch controller connected to the memory identifies the audio/video source which corresponds to the received channel request and controls the switch to connect the identified source to the input receiving circuitry. In a preferred embodiment, driving circuitry is coupled to each of the audio/video sources to control the tuning and/or other functions thereof. A driver controller connected to the memory obtains the information for controlling the tuning functions of the identified source, and controls the driving circuitry in accordance with the obtained information to tune the identified source to the requested channel.

Other objects and advantages will become apparent from the following detailed description when taken in conjunction with the drawings, in which:

Figure 1:
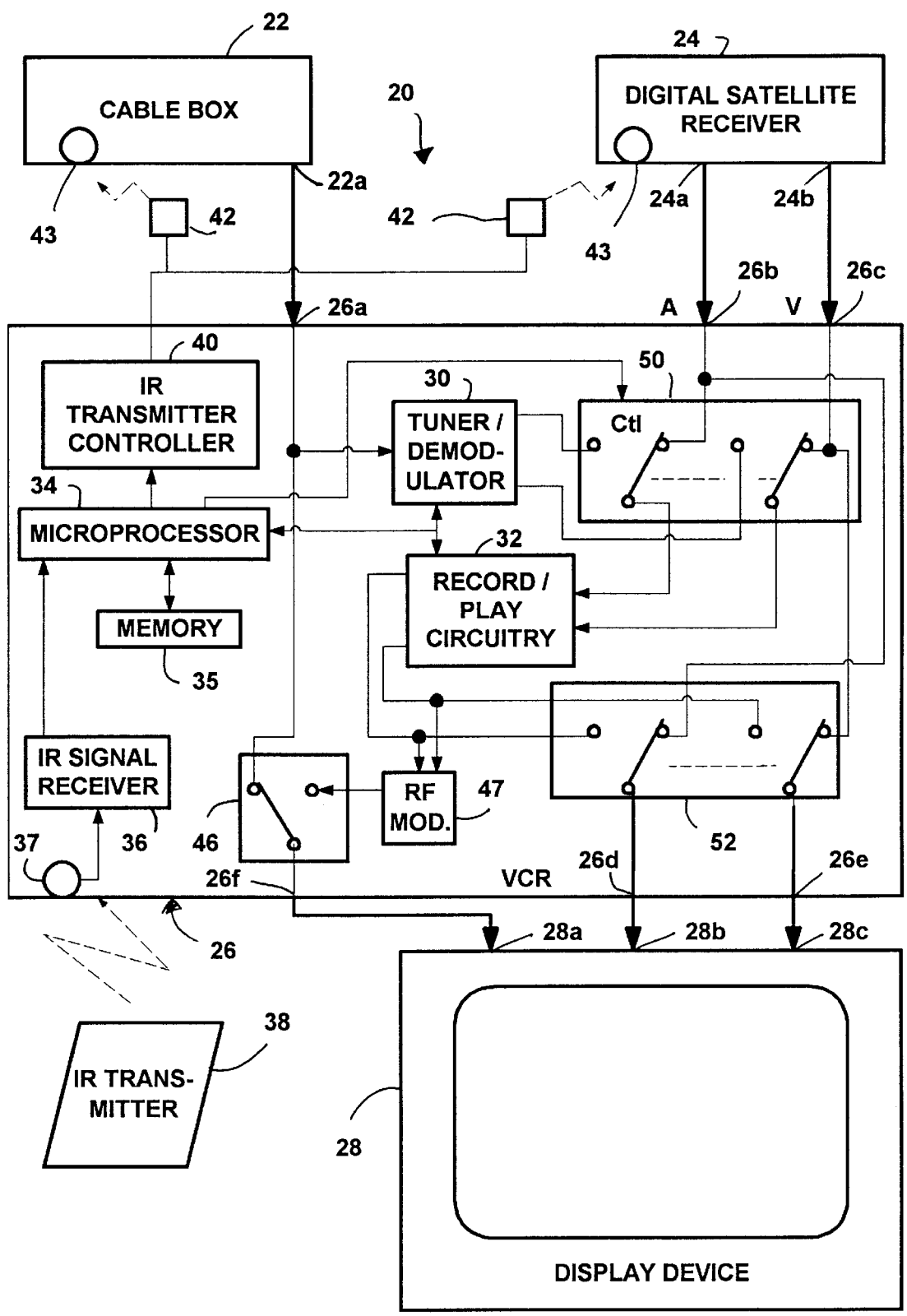
FIG. 1 is a block diagram showing a plurality of audiovisual components connected to a display device, including a videocassette recorder constructed in accordance with the invention.

While the invention is amenable to various modifications and alternative constructions, certain illustrated embodiments thereof are shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, there is shown a television system of audio/video sources generally designated 20 including a cable box 22, a digital satellite receiver 24, a videocassette recorder (VCR) 26 and a display device 28. The display device 28 may comprise a standard television receiver and/or a monitor. The cable box 22 is connected at an output jack 22a to the 75 ohm input jack 26a on VCR 26, and the digital satellite receiver 24 is connected at an audio output jack 24a and video output jack 24b to the audio and video input jacks 26b and 26c, respectively, of the VCR 26. The VCR is connected at its 75 ohm output jack 26f to a corresponding 75 ohm input jack 28a on the display device 28. Lastly, the illustrated VCR is connected at its line-level audio output jack 26d and video output jack 26e to the audio and video input jacks 28b and 28c on the display device 28.

For simplicity in FIG. 1, the digital satellite receiver 24 (outputs 24a and 24b) and VCR 26 (inputs 26b and 26c and outputs 26d and 26e) are shown as having a single audio output separate from a single video output. However, it is understood that the single audio line shown in FIG. 1 may represent either monaural or stereo channels, and the single video path may represent either composite or separate Y/C video outputs.

Moreover, as shown in FIG. 1, the display device 28 is capable of receiving line level audio signals (stereo or monaural) and Y/C separated or composite video signals, however this is not necessary to the invention, as the VCR can modulate the signals if necessary to connect to a standard television receiver. In addition, the illustrated display device 28 is configured for direct reception from the cable box 22 and therefore inherently allows for selection between input sources. However, as can be appreciated, any number and/or configuration of switches can be internally or externally provided that enable a display device 28 having only a single modulated input to function with the present invention. As another feature, the VCR preferably bypasses the signal through the optimal switch setting for the television when turned off. For example, the VCR will set the switches for Y/C and stereo audio when not active. Lastly, the present invention will function with high definition televisions (HDTV), and may, for example, facilitate the operation of such a television in how it deals with both analog and digital broadcasts. With HDTV, the VCR 26 will optimally pass digital signals to the display device 28, and either record the signals digitally or convert them to analog signals as necessary for analog recording.

The VCR 26 includes electrically controllable tuner/demodulator circuitry 30 and record/play circuitry 32 which operate in a known manner. For example, the tuner/demodulator circuitry 30 is controlled by a microprocessor 34 and memory 35 to tune to a certain channel based on direct user input or indirect user input in conjunction with a clock timer. The record/play circuitry 32 records and plays tapes as controlled by commands received from the microprocessor 34 as similarly instructed by the user.

In accordance with one aspect of the present invention, in a first embodiment described herein and shown in FIG. 1, the VCR 26 contains the control circuitry that automatically selects a signal source (e.g., cable box 22 or digital satellite receiver 24) connected thereto based upon a simple user input, preferably a channel selection. In addition, the preferred control circuitry also controls the signal source 22 or 24 as necessary to power-up and tune the selected source to the requested channel.

To this end, the VCR 26 includes user input circuitry which may be a button on a front panel (not shown) and/or an infrared signal receiver 36 and sensor 37 for converting infrared signals into data suitable for the microprocessor 34. Among other functions, the microprocessor 34 decodes the received data as user commands. This allows the VCR 26 to be remotely controlled by infrared signals resulting from the user's manipulation of a suitable IR transmitter 38.

In keeping with the invention, in addition to receiving instructions directed to the operation of the VCR 26, the microprocessor 34 also determines whether received infrared signals have any relationship to one of the audio/video signal sources (e.g., cable box 22 or digital satellite receiver 24) connected to the VCR 26. In particular, if the decoded infrared signal is recognized by the microprocessor 34 as being a channel command, the microprocessor 34 controls the appropriate signal source 22 or 24 to tune to the requested channel as described in more detail below.

It can be appreciated that the channel command need not be directly received from the user, but can be instead received from a memory for timed recording and/or be encoded into VCR+® (VCR Plus) numbers or the like. In the VCR+ format, the time, date and station identity are combined into an encoded number which suitable VCRs are capable of decoding into time, date and local channel numbers. Accordingly, as used herein, the term channel when as an input to the VCR or the like can originate from either direct or indirect (e.g. a timer memory or encoded) user input.

Although not necessary to the invention, to accomplish the control of the cable box 22 and digital satellite receiver 24, the VCR 26 includes an IR transmitter controller 40 connected to the microprocessor 34. The IR transmitter controller 40 is connected to drive one or more infrared light emitting diodes (LEDs) 42 or the like individually or commonly coupled to the cable box 22 and digital satellite receiver 24. The VCR memory 35 stores appropriate control codes necessary for controlling the cable box 22 and digital satellite receiver 24. These may be learned by the VCR from the infrared remote control transmitters of the various source components, or selected from a table of known codes based upon the identity of the particular source component. For example, during a one-time initialization procedure, the VCR 26 can be informed via responses to on-screen menu prompts of the various source components connected thereto. Such cable box tuning control using infrared signals output by a VCR is described in U.S. Pat. Nos. 5,151,789 and 5,297,204, herein incorporated by reference in their entireties. It can be appreciated that the VCR 26 can be similarly arranged to control the display device 28 if desired.

In accordance with another aspect of the invention, the VCR 26 includes a switch 50 that connects the appropriate audio and or video outputs from the sources 22, 24 to its own internal record/play circuitry 32. Tuner/demodulator circuitry 30 is connected to the switch 50 if the source (e.g., cable box 22) needs to be first be demodulated. Thus, in a preferred embodiment shown in FIG. 1, the switch 50 connects either the output of the tuner/demodulator 30 (from cable box 22) or the output of the digital satellite receiver 24 to the recording circuitry 32, as determined by the microprocessor 34 (discussed below).

A switch 46 is preferably provided that regulates whether the modulated output of the cable box 22 or the record/play circuitry 32 is connected to the display device 28. To obtain the modulated output from the record/play circuitry 32, an RF modulator 47 is provided that modulates the signal onto channel 3 or 4. The switch 46 is a conventional TV/VCR selection switch under the control of the microprocessor 34.

In keeping with the invention, a switch 52 is also provided that regulates whether the demodulated output of record/play circuitry 32 or the digital satellite receiver 24 is connected to the display device 28. The switch 52 may be operated independently of the setting of switches 46 or 50, and provides a similar function to the conventional VCR/TV switch 46. Note that for simplicity the switches 50 and 52 are shown as double-pole, double-throw switches, but are of course appropriate multi-pole (e.g. four-pole, double-throw) switches as necessary to switch separated stereo and Y/C signals.

Figure 2:
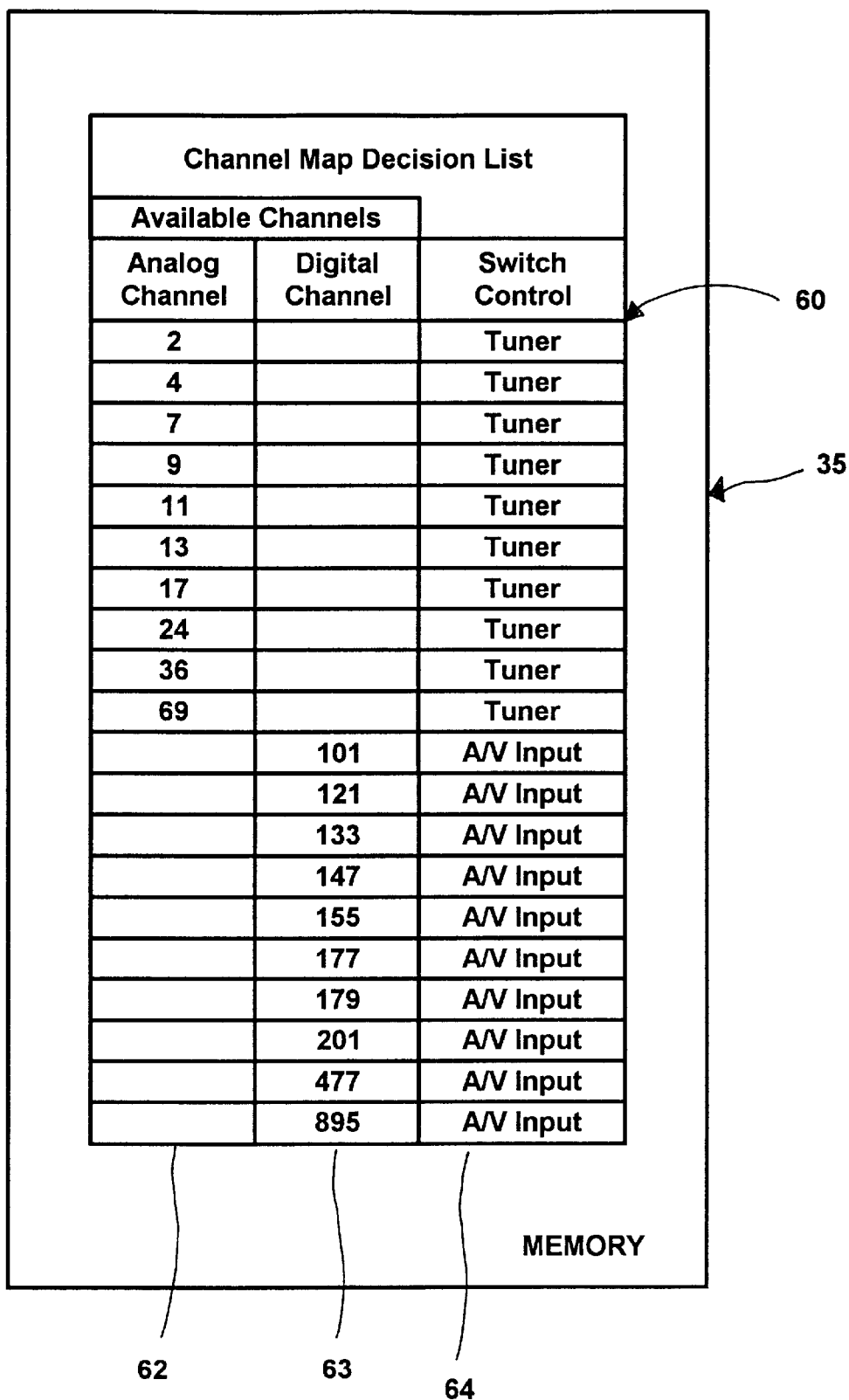
FIG. 2 is a block diagram representing a memory map for associating audio/video signal sources with television channels.

Turning to an explanation of the operation of the invention, to determine which device's (22 or 24) signal output will be connected to the record/play circuitry 32, the microprocessor 34 accesses its memory 35. As shown in FIG. 2, the memory 35 includes a channel map decision list 60 of available channels (column 62 or 63) and their corresponding source device (column 64). Note that conventional cable channels range from channels 2–125, while (in one digital receiving system) digital channels range from channels 100–999. However, although there is some overlap, cable channels rarely exceed 99. Thus, the channel map decision list 60 may have default values such that channels 2–99 are initially assumed to be cable (analog) channels, while channels 100–999 are assumed to be digital channels. If necessary, such defaults may be overridden such as via user responses to on-screen menus. Thus, with one type of digital satellite receiver 24 (wherein channels begin at 100), the list 60 may simply comprise a range of channels, i.e., channels 1–99 are associated with cable or off-air channels, while channels 100–999 are associated with digital satellite receiver channels. However, having such a short list prevents skipping of channels that are of no interest or are unavailable to the user, as will become apparent below.

The channel map decision list 60 may be compiled in any number of ways. For example, during initialization the VCR may scan through all possible channels and add those detected to the channel map decision list 60. The VCR first controls the cable box to step through channels 2–99, adding those channels to the list 60 whenever an appropriate video signal is detected. The VCR repeats this for the digital satellite receiver, stepping through channels 100–999. The user may then manually add or delete channels to or from the list 60, or change the setting (analog to digital or vice-versa) for a given channel in the channel map decision list 60.

Figure 3A:
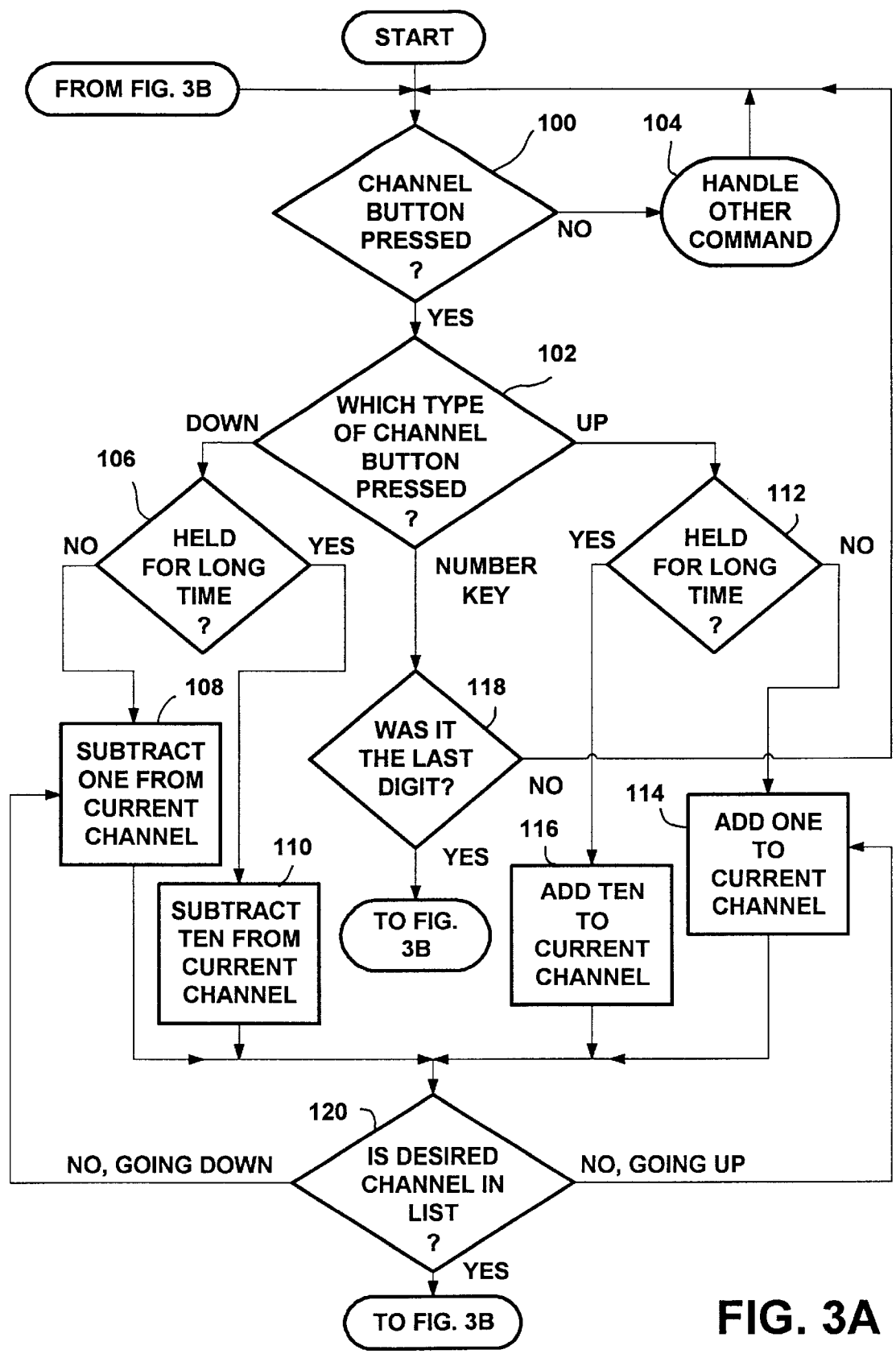
FIGS. 3A–3B comprise a flow diagram for automatically selecting and controlling one of the audio/video signal sources based upon an input channel selection.

As shown in FIG. 3A, at step 100 the switching and control mechanism of the present invention is initiated upon detection by the VCR of an infrared request being received at its IR signal receiver, or a request being initiated by a timed event (e.g., programmed recording). The microprocessor 34 examines the received IR signal and determines at step 100 whether a channel button of the IR transmitter 38 was detected, and if so, at step 102 whether a channel-up (increment) request, channel down (decrement) request or a digit (zero through nine) was received. If another command was received, it is handled as necessary at step 104. Note that a programmed (timed) or VCR+command may become such a user channel command at the proper time and date. However, for simplicity hereinafter, the channel command will be assumed to be directly, rather than indirectly, entered by the user, although there is no intention to limit the invention to requiring such direct entry.

If the request was a channel down command, the microprocessor 34 next determines at step 106 if it has been continuously receiving channel down commands for a long time, e.g., two full seconds or longer, or whether it has just begun to receive such commands (or a one-time command). If not held for a long time, at step 108 the microprocessor 34 subtracts one from the current channel value (retained in memory). If determined to have been continuously held for a long time, at step 110 the microprocessor 34 subtracts ten from the current channel value. Although not necessary to the invention, subtracting ten (or adding ten as described below) allows for rapid scrolling through a large number of channels, which is beneficial to the user when dealing with channels up to 999. Note that slow (e.g. one channel per second) single-channel scrolling when held for a short time, followed by rapid (e.g. ten channels per second) when held for a long time alternatively provides a similar benefit.

If the request was instead a channel up command, the microprocessor 34 similarly determines at step 112 if it has been continuously receiving channel up commands for a long time (indicative of a rapid scroll request) or whether it has just begun to receive such commands. If not held for a long time, at step 114 the microprocessor 34 subtracts one from the current channel value, else at step 116 the microprocessor 34 adds ten to the current channel value to provide rapid adjustment.

Lastly, the channel button pressed on the IR transmitter 38 may have been a digit (zero through nine). Since the present system contemplates operation with channels up to 999, three digits (a hundreds, tens and ones digit) are preferably received for direct channel access. Of course, other arrangements such as one or two digits followed by an "Enter" command (all digits entered), the elapsing of a time duration (after two seconds, tune to the one digit 2 through 9 or the two digits 02 through 99 received) or the like (e.g., enable three digit entry mode only if the user first presses a "three digit" key) may be alternatively employed. In any event, unless the command was determined to be the last digit, at step 118, the process returns to step 100 to obtain additional information, i.e., more digits. If the last digit is known, the process branches to step 122.

Figure 3B:
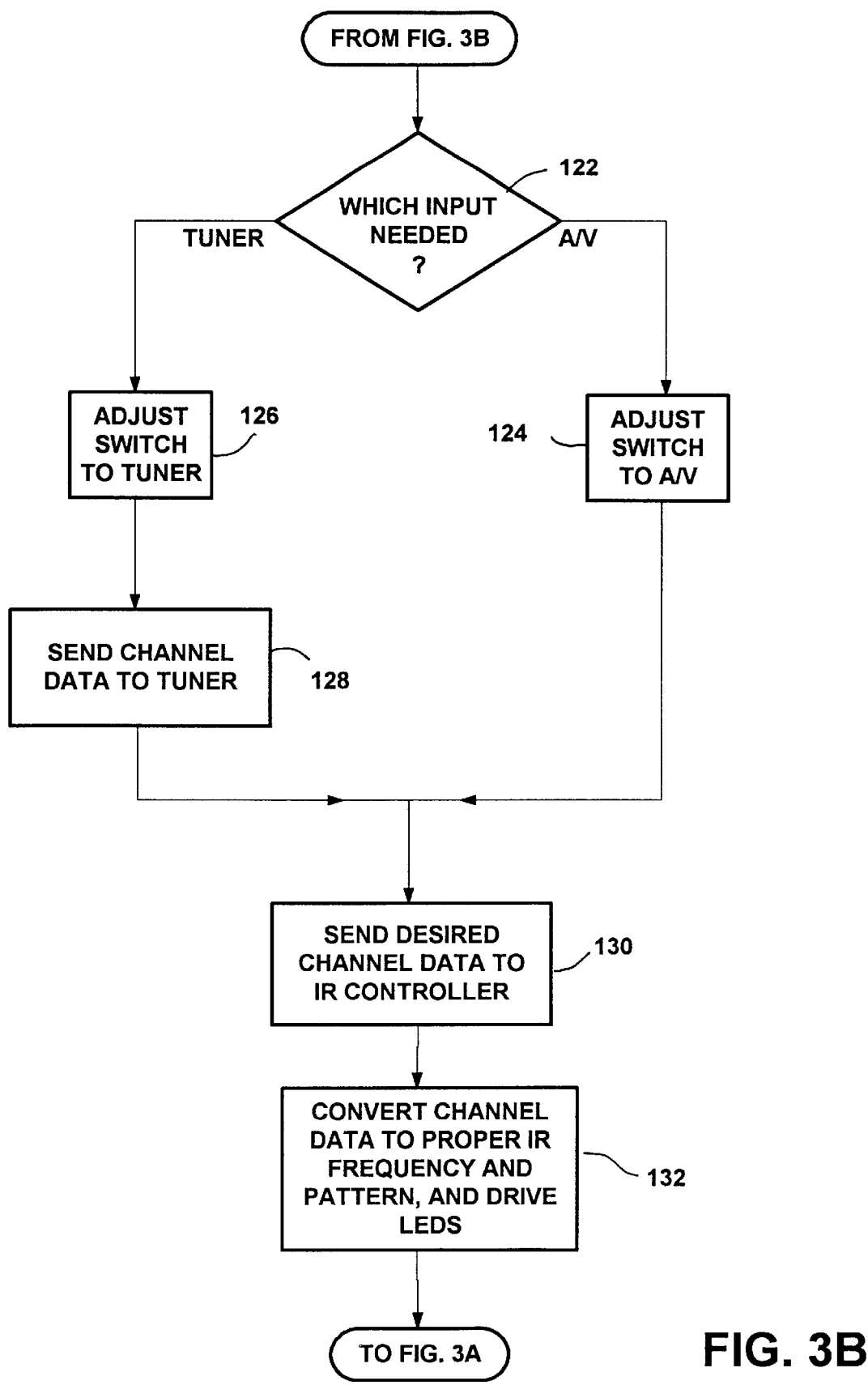

Once a new channel is received by the channel down or channel up commands, at step 120 of FIG. 3A the microprocessor 34 accesses the channel map decision list 60 to determine if the requested channel is in the list 60. If not, and the channel down button of the IR transmitter 38 was pressed, the process returns to step 108 and decrements the channel (the process loops repeatedly, if necessary) until a channel is found that matches one in the list 60. At least one default channel (e.g., channel 002) is in the channel map decision list 60 to prevent an infinite loop condition. Once a match is found, the process continues to step 122 in FIG. 3B as described below.

Similarly, if the channel up button of the IR transmitter 38 was pressed and no match is found, the process increments the channel at step 114 (looping repeatedly, if necessary) until a channel is found that matches one in the list 60. Once a match is found, the process continues to step 122 in FIG. 3B as described below.

Lastly, if the channel number was directly input via digits, the process ordinarily bypasses step 120 and directly proceeds to step 122 to attempt to tune to the entered channel using a source default based on the channel value, e.g., 1–99 is analog, 100–999 is digital. If desirable, it is feasible to compare a directly-entered channel with the channel map decision list 60 by performing step 120 or the like, although it is preferable to directly attempt to tune the channel.

At step 122, the microprocessor determines from the channel map decision list 60 whether an analog or digital channel has been requested. If a digital channel has been requested, at step 124 the microprocessor 34 controls switch 50 to connect the digital satellite receiver outputs 24a and 24b to the record/circuitry 32.

If an analog channel has been requested, at step 126 the microprocessor 34 controls switch 50 to connect the output of the tuner/demodulator circuitry 30 to the record/play circuitry inputs 32. At step 128, the microprocessor 34 also controls the tuner/demodulator circuitry 30 to tune to channel 3 or 4 as necessary to demodulate the output of the cable box.

Lastly, the microprocessor 34 controls the corresponding analog device 22 or digital device 24 to tune to the requested channel, e.g., 2 through 99 or 100 through 999, respectively. At step 130, the microprocessor obtains from memory 35 the remote control codes for the appropriate device and passes those codes as data to the IR transmitter controller 40. At step 132, the IR transmitter controller 40 converts the data to the proper IR frequency and pattern, and drives the LEDs 42 therewith, which are coupled to IR sensors 43 on the devices. The process returns to await the next command at step 100.

As can be appreciated, the VCR 26 thus provides a seamless mechanism for selecting and controlling the appropriate device. The user merely inputs a desired channel and from the user's perspective, the VCR 26 handles the request as if the channel came from a single source of channels 1–999 connected to the VCR 26. Initial setup is simple, as the user connects the cable box output 22a to the 75 ohm input jack 26a, the digital satellite receiver outputs 24a and 24b to the audio and video inputs 26b and 26c on the VCR, and follows on-screen prompts to perform an initialization routine. Moreover, the VCR 26 can be operated in the above-described mode according to the invention, or can alternatively by configured to operate in a conventional mode. For example, a consumer may purchase the VCR before purchasing a digital satellite receiver, and thus only need to connect it to the cable box.

Although the present invention has, been described as being incorporated into a VCR, there is no intention to limit it to a VCR. Indeed, the present invention may be incorporated into any television based device, including a stand-alone set-top box 200 (FIG. 4) or the display device 300 (FIG. 5).

Figure 4:
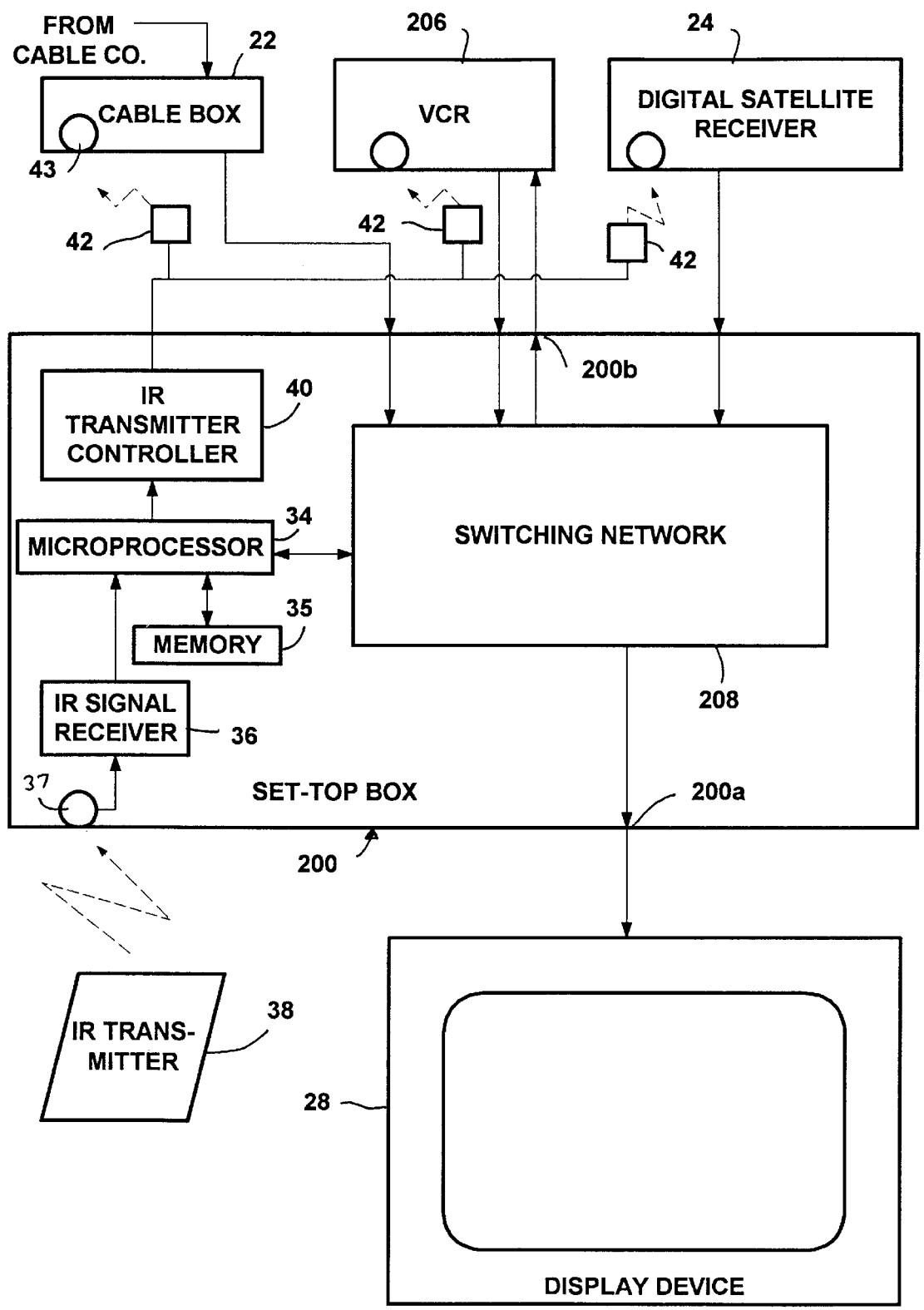
FIG. 4 is a block diagram showing a plurality of audiovisual components connected to a display device, including a set-top box controller constructed in accordance with the invention.

FIG. 4 shows the invention in the set-top box 200, where like-numbered components function in a similar manner to those described with reference to FIG. 1. The inputs to the set-top box 200 from the various sources such as cable box 22, digital satellite receiver 24 and a conventional VCR 206 are connected to a switching network 208. The outputs 200a and 200b of the set-top box may be connected to a display device 28 or the VCR 206. The set-top box 200 functions like the VCR 26 described above, but instead of connecting the appropriate signals to its recording circuitry, the set-top box switches the signals to its output or outputs. From there, a conventional VCR such as 206 or a display device 28 can utilize the appropriate signals. It can be appreciated that the set-top box can control the VCR and/or the display device by outputting infrared signals thereto. Accordingly, a set-top box constructed in accordance with the present invention can effectively convert a conventional VCR into a VCR that appears to record the selected channel in a manner that is invisible to the user. Note also that it is feasible to map an otherwise unused channel to the playback output of the VCR 206. Thus, if channel 090 is unused, selecting channel 090 may switch the VCR 206 output to the display device 28, and control the VCR 206 to play a tape loaded therein.

In keeping with the invention, as in FIG. 2, the set-top box 200 maintains a channel map decision list 60 in its memory 214, which determines which source will be output from the switching network 208. Note that using existing cable box control technology, it is also feasible for the VCR 206 to output IR signals to control the set-top box 200, i.e., the VCR serves as the infrared transmitter 38 (although at present conventional VCRs do not allow for direct entry of channels up to channel 999). According to the present invention, the set-top box 200 thereafter decodes the VCR-emanated signals and in turn outputs IR signals to the LEDs 42 to control the channel-tuning of the selected device and the connection of the audio/video signals from the selected device to the VCR 206 and/or the display device 28. As can be appreciated, the cable box 22 and digital satellite receiver 24 can also be directly connected to the VCR 206 for conventional operation.

Figure 5:
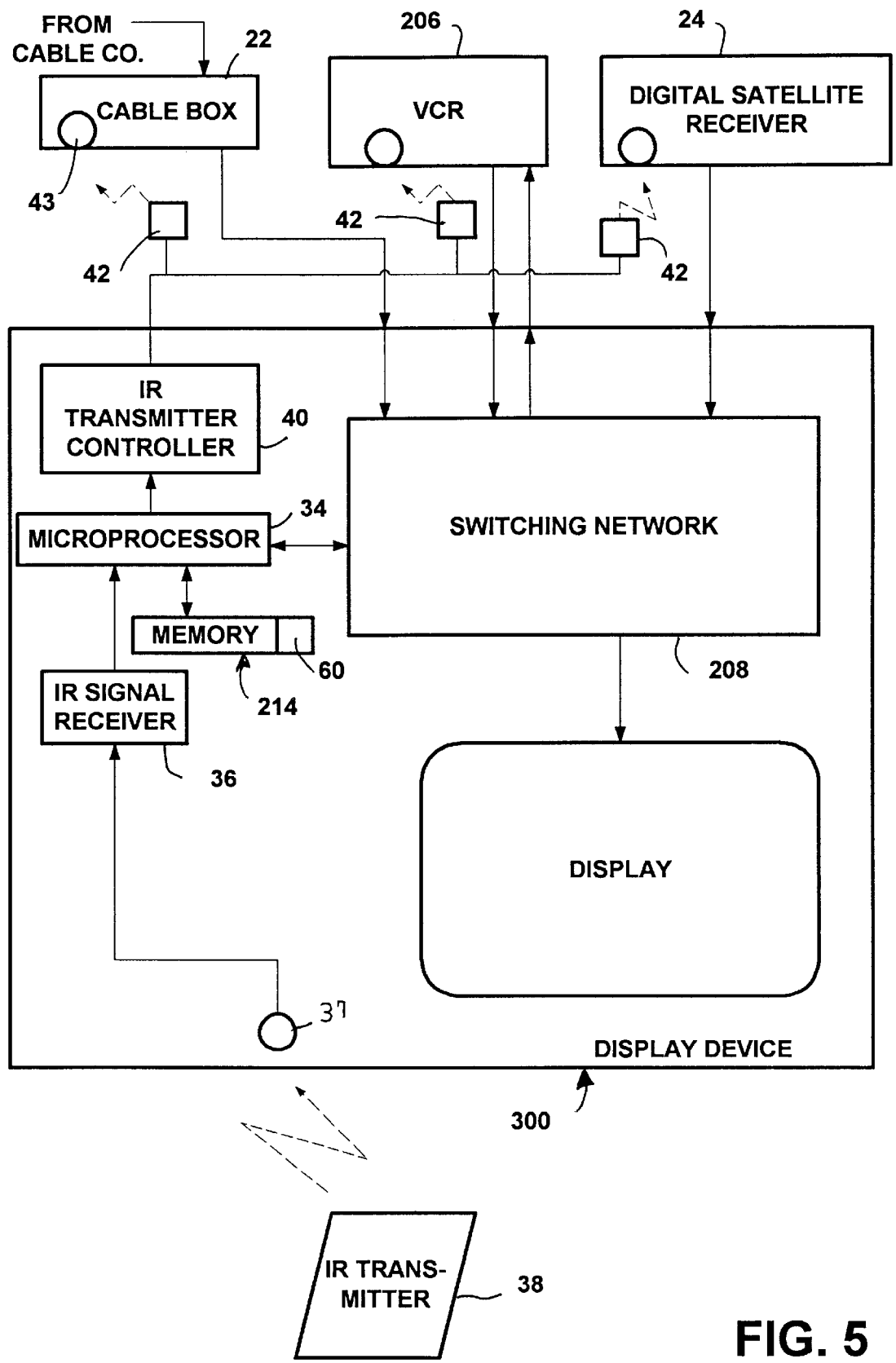
FIG. 5 is a block diagram showing components constructed in accordance with the invention and incorporated into a display device.

Alternatively, as shown in FIG. 5, it is feasible to have the television display 300 include the circuitry that accomplishes the present invention. In such a system, an external set-top box is essentially incorporated into the internal circuitry of a television monitor/receiver. For simplicity, the operation of internal rather than external circuitry to switch and control appropriate devices based upon a channel request will not be described herein in detail, since it is similar to that already described.

Moreover, the present invention allows for multiple sources having overlapping channel assignments to be controlled with a simple user input of a channel. The user builds a map in memory that correlates a channel input with a particular source. Later, when the user enters the channel number, the present invention takes care of switching the source to an appropriate video input, e.g., a display device and/or the recording circuitry of a VCR.

Figure 6:
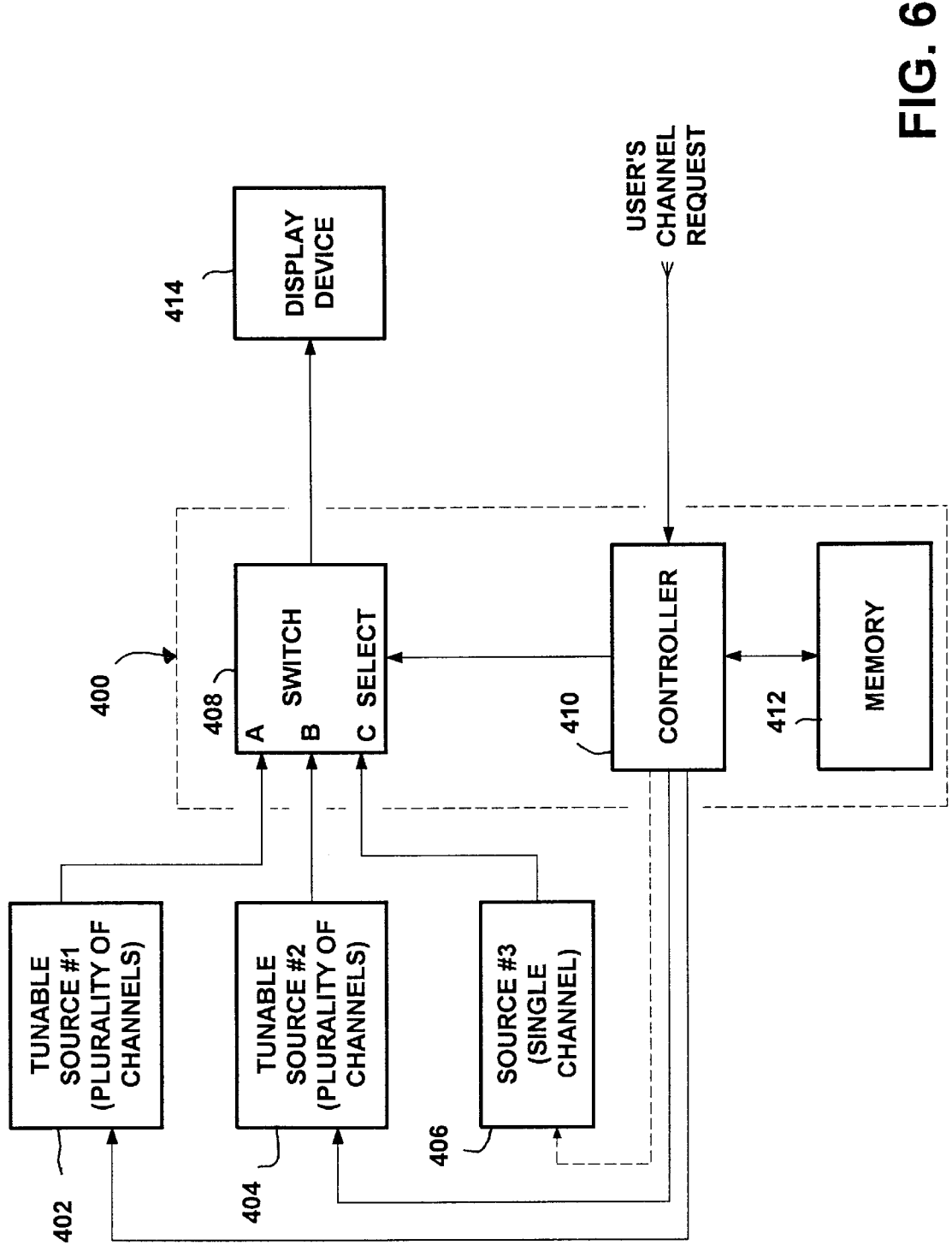
FIG. 6 is a block diagram showing a plurality of audio-visual components switched to a display device by an apparatus constructed in accordance with the invention.

Thus, as shown in FIG. 6, an apparatus 400 is provided that connects a tunable source of channels 402, a tunable source of channels 404, and a single output channel device 406 (e.g., a laserdisc player) to a switch 408. The tunable channels of each source may overlap, e.g., the tunable source 402 can output a range of channels from 2–125, while the tunable source 404 can output channels from 1–999. A controller 410 receives a unique user channel request (directly or from a memory 412), and uses this request to connect the appropriate source to the video input, shown as display device 414. It can be appreciated that the various components in apparatus 400 may be constructed as a stand-alone unit or incorporated into the circuitry of any of the sources 402–406 or the display device 414.

Figure 7:
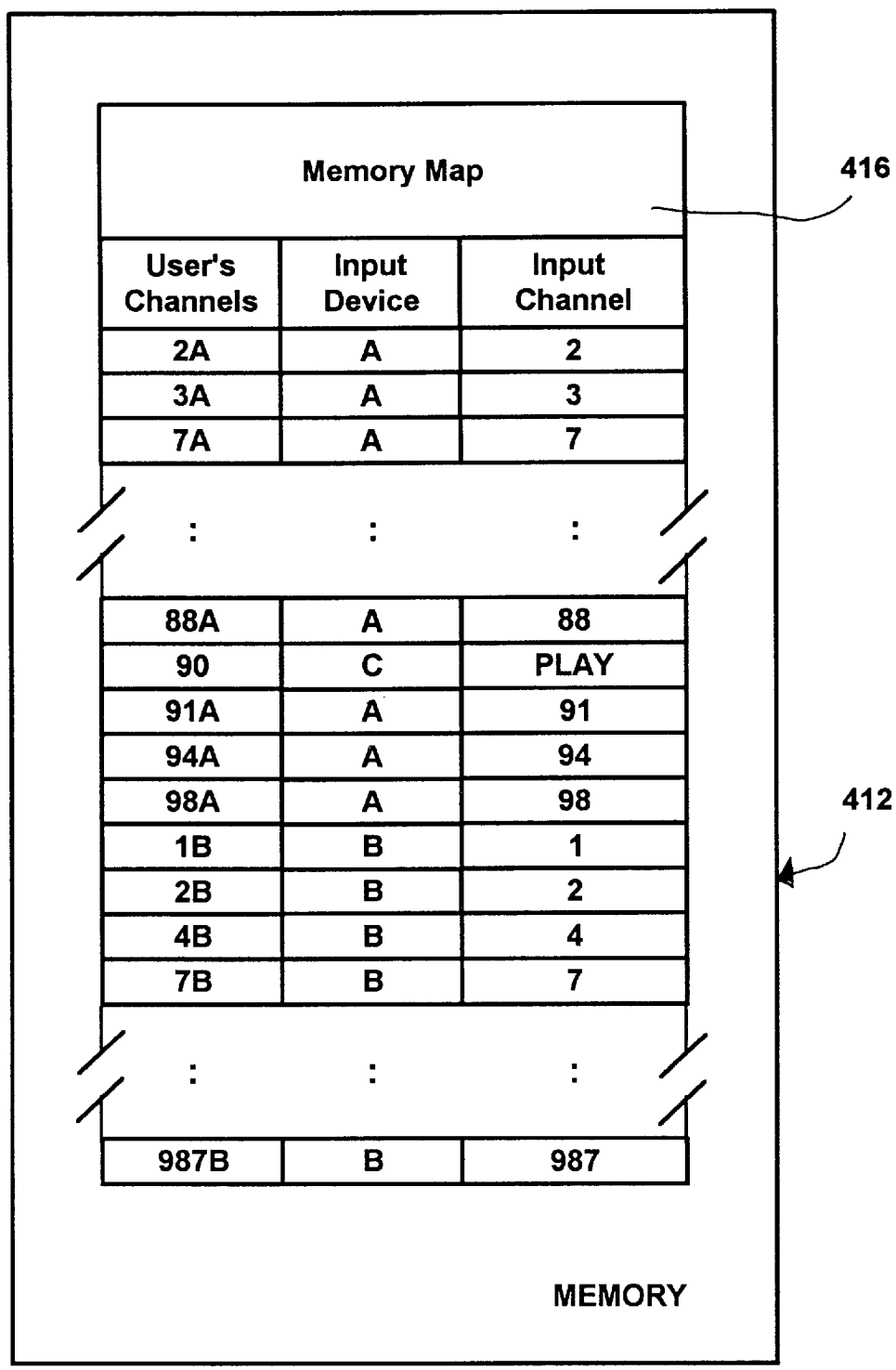
FIGS. 7 and 8 are block diagrams representing alternative memory maps for associating audio/video signal sources with user input channels.

To accomplish selection of the appropriate source, once the controller 410 receives the unique user channel request, the controller 410 accesses a memory map 416 (FIG. 7) in its memory 412. As shown in FIG. 7, the preferred channel request is entered as an alphanumeric code. Thus, an input of "7A" is stored in the map 416 such that tunable source 402 (switch input A) will be connected to the display device 414 when "7A" is received, while an input of "7B" will connect tunable source 404 (switch input B) to the display device 414.

Note that if "90" is received (with or without an accompanying letter), in the present example the single channel source 406 (switch input C) will be connected.

In addition, the map 416 may also contain a channel tuning assignment to which the connected source may be tuned. Thus, upon an input of "7A," not only will source 402 be switched to the display device 414, but source 402 will be tuned to its channel 7. As previously described, this may be accomplished by outputting a suitable infrared signal to the appropriate source. Note than when scrolling up (or down), the switching of the appropriate source is seamless to the user, as channel 98A is immediately followed by channel 1B upon pressing the up channel key of a suitable remote control transmitter.

It can be appreciated that the infrared output need not represent a channel for tuning a source, but can, for example, be a "PLAY" command or the like when the single channel output source 406 (e.g., a laserdisc) is selected, i.e., when "90" is entered. If desired, the controller 400 may be set up such that channel 90 is skipped during channel scrolling, with the connection of source 406 only occurring (and the optional PLAY command only being issued) from a direct entry.

Figure 8:
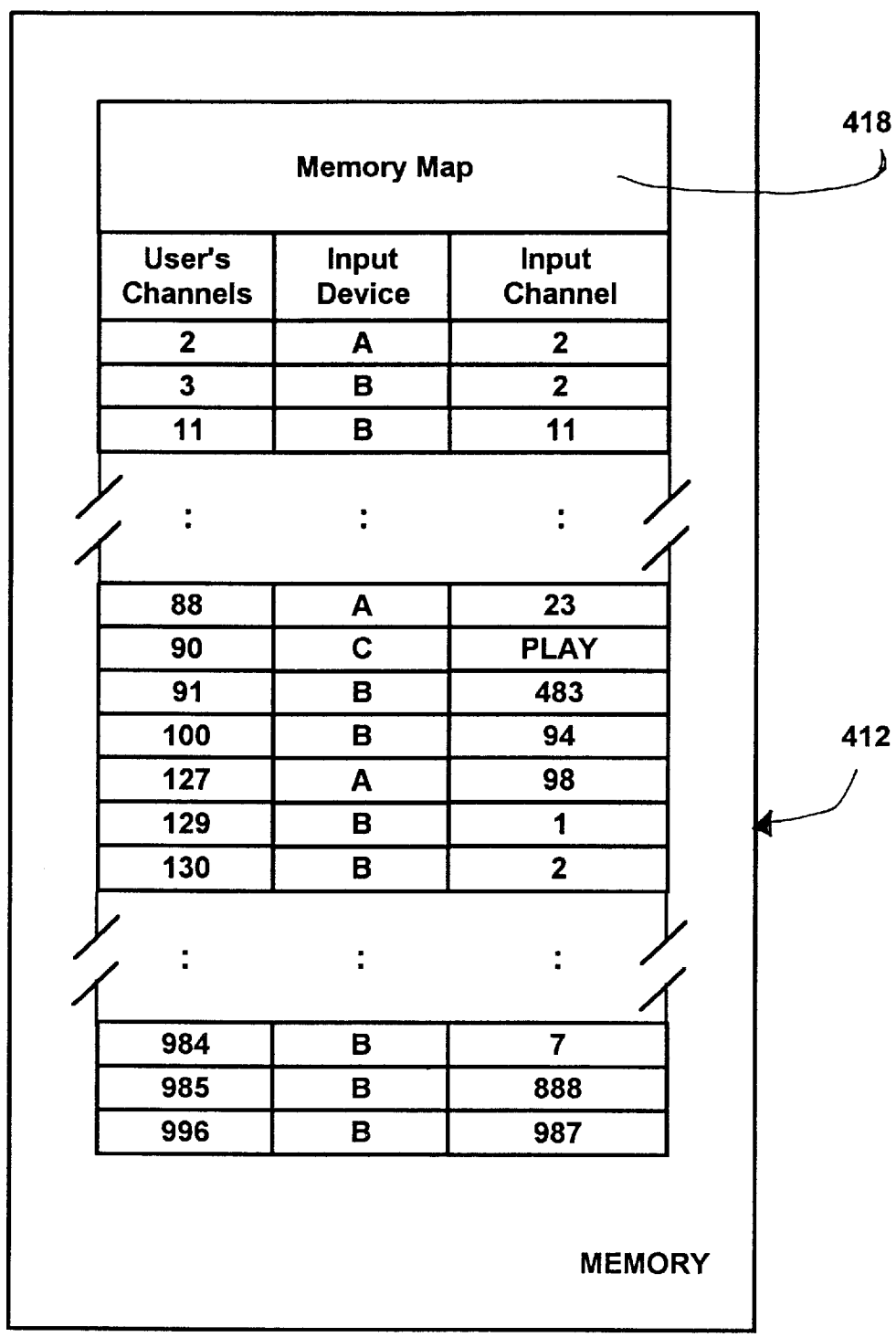

Lastly, as shown in FIG. 8 it is feasible to utilize a memory map 418 wherein unique user channels are mapped to virtually any source in virtually any order. With such a mapping scheme, alphabetic characters may or may not be required to identify a channel, and more than one unique user channel can represent the same source and source channel multiple times. However, this mapping scheme is less preferable than that shown in FIG. 7 because it is believed that users will have difficulty assembling the map and remembering the assignments. For example, printed or on-line television guides will not necessarily correspond to any channel assignment, (which would be difficult to accomplish when assigning overlapping channels), nor would the user necessarily know which source was selected unless an on-screen prompt was provided. Nevertheless, the present invention will function with a mapping scheme as shown in FIG. 8 and with others, as long as a source is correlated with a unique channel request input by a user.

As can be seen from the foregoing detailed description, there is provided a television-based device that simplifies user operation of a plurality of signal sources. A videocassette recorder, television receiver, monitor or other system control device automatically selects the signal source for the user. The selection, connection and operation of an appropriate signal source is automatically performed for the user based upon a simple user request such as a channel command. The device takes advantage of the optimal output capabilities of a device to maximize signal quality.

What is claimed is:

1. An apparatus for selecting audiovisual signals from two or more sources of such signals having overlapping assignments of physical channel numbers and delivering the selected audiovisual signals to an audio/video input, the apparatus comprising, a memory mapping each of the channel numbers of the two or more sources to a unique channel identifier such that duplicate channel numbers are resolved by mapping each of them to a different channel identifier, a switch for selecting one of the sources for connection to the audio/video input, and a controller in communication with the memory for controlling the switch to connect the audio/video input to the source of the channel number correlated to a requested user channel identifier.

2. The apparatus of claim 1 wherein the audio/video input is connected to a display device.

3. The apparatus of claim 1 wherein the audio/video input is connected to recording circuitry of a videocassette recorder.

4. The apparatus of claim 1 wherein at least one of the signal sources comprises a digital satellite receiver.

5. The apparatus of claim 1 wherein at least one of the signal sources comprises a cable box.

6. The apparatus of claim 1 wherein the audio/video input comprises separate inputs for receiving separated audio and video signals.

7. The apparatus of claim 6 wherein the video signals are separated into luminance and chrominance component signals.

8. The apparatus of claim 1 further comprising user channel identifier circuitry connected to the controller.

9. The apparatus of claim 8 wherein the user channel identifier input circuitry includes an infrared signal receiver.

10. The apparatus of claim 1 wherein the memory, the switch and the controller are incorporated into a videocassette recorder.

11. The apparatus of claim 1 further comprising driving circuitry connected to the controller for tuning the source switched to the video input to the channel number correlated to the requested user channel identifier.

12. The apparatus of claim 11 wherein the driving circuitry includes at least one light emitting diode coupled for communicating infrared control signals to at least one of the two or more sources.

13. An apparatus for providing audiovisual signals from one of a plurality of audio/video sources having overlapping channel number assignments to input receiving circuitry, comprising, a memory for storing a user built channel map comprising a plurality of user channel identifiers that have each been assigned by the user to correlate to one of the channel numbers of the plurality of the audio/video sources, where the channel map assigns overlapping channel number assignments to different channel identifiers, a receiver for receiving a request for a specific user channel identifier, a processor for reading the memory to select the audio/video source that is associated with the specific user channel identifier request, a switch controlled by the processor for switching the selected audio/video source to the input receiving circuitry, and driving circuitry connected to the processor for controlling the selected audio/video source to tune the channel number associated with the specific user channel identifier.

14. The apparatus of claim 13 wherein the input receiving circuitry is connected to a display device.

15. The apparatus of claim 13 wherein the input receiving circuitry includes recording circuitry of a videocassette recorder.

16. The apparatus of claim 13 wherein the input receiving circuitry includes a tuner.

17. The apparatus of claim 13 wherein the input receiving circuitry receives separate audio and video signals.

18. The apparatus of claim 17 wherein the video signals are separated into luminance and chrominance component signals.

19. The apparatus of claim 13 wherein at least one of the audio/video sources comprises a digital satellite receiver.

20. The apparatus of claim 19 wherein at least one other of the audio/video sources comprises a cable box.

21. The apparatus of claim 13 wherein the receiver for receiving the specific channel identifier request includes an infrared signal receiver connected to the processor.

22. The apparatus of claim 13 wherein the driving circuitry includes at least one light emitting diode coupled for communicating infrared control signals to the plurality of sources.

23. The apparatus of claim 13 wherein at least the memory, the processor and the switch are incorporated into the circuitry of a videocassette recorder.

24. The apparatus of claim 13 wherein at least the memory, the processor and the switch are incorporated into the circuitry of a display device.

25. The apparatus of claim 13 wherein at least the memory, the processor and the switch are incorporated into a stand-alone unit.

26. Apparatus for selectively providing audiovisual signals from one of a plurality of audio/video sources having overlapping channel number assignments to input receiving circuitry, comprising, a switch for selectively connecting the audio/video sources to the input receiving circuitry, a memory mapping each one of a plurality of user channel identifiers to a different one of the channel numbers of the plurality of the audio/video sources, including the channel numbers with overlapping channel number plurality of user channel identifiers to a different one of the channel numbers of the plurality of the audio/video sources, including the channel numbers with overlapping channel number assignments, and for further storing information for controlling the tuning functions of each of the audio/video sources, channel input circuitry for receiving a user channel identifier request, a switch controller connected to the memory for identifying the audio/video source which corresponds to the received user channel identifier request and for controlling the switch to connect the identified audio/video source to the input receiving circuitry, driving circuitry coupled to each of the audio/video sources for controlling the tuning functions thereof, a driver controller connected to the memory for obtaining the information for controlling the tuning functions of the identified audio/video source and for controlling the driving circuitry in accordance with the obtained information to tune the identified audio/video source to the channel number which corresponds to the user channel identifier request.

27. A videocassette recorder connected to receive signals from a plurality of audio/video sources having overlapping channel number assignments, comprising, recording circuitry, a receiver for receiving commands from a user, driving circuitry for controlling the signals output by the audio/video sources, a memory mapping each of the channel number assignments of the plurality of audio/video sources to a different one of a plurality of user channel identifiers, including the overlapping channel numbers, the memory further including information for controlling the signals output by the audio/video source, a switch for connecting one of the audio/video sources to the recording circuitry, and a processor, the processor detecting a user channel identifier requested by the user at the receiver and reading the memory to determine the audio/video source associated with the requested user channel identifier, the processor controlling the switch to connect the associated audio/video source to the recording circuitry and controlling the driving circuitry to control the signal output by the audio/video source to correlate to the channel number corresponding to the requested user channel identifier.

28. The apparatus of claim 27 wherein the videocassette recorder is connected to a display device.

29. The apparatus of claim 27 wherein the driving circuitry includes at least one light emitting diode coupled for communicating infrared control signals to the plurality of sources.

* * * * *